United States Patent [19]
Beattie

[11] 3,830,460
[45] Aug. 20, 1974

[54] POLYMERIC REPLICA MOLDS AND REPLICATION PROCESSES FOR PRODUCING PLASTIC OPTICAL COMPONENTS

[75] Inventor: John O. Beattie, Riverside, Conn.

[73] Assignee: Beattie Developments Company, Stamford, Conn.

[22] Filed: Dec. 21, 1971

[21] Appl. No.: 210,519

Related U.S. Application Data

[63] Continuation-in-part of Ser. No. 841,758, July 15, 1969, abandoned.

[52] U.S. Cl.................. 249/134, 425/808, 249/117
[51] Int. Cl.......................... B29c 7/00, B29d 11/00
[58] Field of Search .......... 425/808; 264/1; 249/134

[56] References Cited
UNITED STATES PATENTS

| | | | |
|---|---|---|---|
| 3,211,811 | 10/1965 | Lanman | 425/808 |
| 3,380,718 | 4/1968 | Neefe | 264/1 |
| 3,422,168 | 1/1969 | Bowser | 425/808 |
| 3,423,488 | 1/1969 | Bowser | 264/1 |
| 3,497,577 | 2/1970 | Wichterle | 264/1 |

Primary Examiner—J. Howard Flint, Jr.
Attorney, Agent, or Firm—Homer O. Blair; Robert L. Nathans; David E. Brook

[57] ABSTRACT

Polymeric replica molds formed from certain specific polymeric compositions are disclosed. The polymeric compositions impart properties to the replica molds which allow the casting of high-quality plastic optical components such as ophthalmic lenses.

Among the polymeric compositions which have been found useful are: (1) cross-linked polymethyl methacrylate; (2) a copolymer of 99–20 parts methyl methacrylate and 1-80 parts acrylonitrile, preferably but not necessarily cross-linked; (3) cross-linked polystyrene; (4) a cross-linked copolymer of 90–10 parts styrene and 10–90 parts acrylonitrile; and, (5) a cross-linked copolymer of 90–10 parts styrene and 10–90 parts methyl methacrylate.

Replication processes including the steps of forming the polymeric replica molds described herein and subsequently using them in the casting of plastic lenses from materials such as polymerized allyl diglycol carbonate are also disclosed.

14 Claims, 5 Drawing Figures

Fig. 4 — Shearing Interferograms of CR-39 Lenses Replicated in Prior Art Plastic Molds Fig. 5 (a)    Fig. 5 (b)    Fig. 5 (c)    Fig. 5 (d)    Fig. 5 (e)

Fig. 5 — Shearing Interferograms of CR-39 Lenses Replicated in New Plastic Molds

POLYMERIC REPLICA MOLDS AND REPLICATION PROCESSES FOR PRODUCING PLASTIC OPTICAL COMPONENTS

CROSS REFERENCE TO RELATED APPLICATIONS

This application is a continuation-in-part of Beattie, Ser. No. 841,758, filed July 15, 1969, now abandoned.

BACKGROUND OF THE INVENTION

1. Field of the Invention

This invention relates in general to the casting of plastic optical components, and more particularly to replication processes for casting plastic lenses using replica molds formed from polymeric compositions which impart properties to the replica molds necessary to cast high-quality ophthalmic lenses.

2. Description of the Prior Art

Replication molding techniques are well known. In such a technique, a replica mold having a surface which is a negative copy of a surface of the final product is first prepared from a master mold. The final product is then molded against the negative surface of the replica mold, thus reproducing the surface configuration of the master mold.

Attempts have been made to manufacture plastic optical elements, particularly plastic ophthalmic lenses, by replication techniques, but satisfactory results have not heretofore been obtained. Exemplary of such attempts are the processes taught in U.S. Pat. Nos. 3,422,168 and 3,423,488, both to G. H. Bowser. These patents teach a replication process in which plastic lenses are cast from replica molds formed from materials such as low molecular weight, non-emulsifiable polyethylene resins. It has been found, however, that plastic lenses cast using Bowser type polyethylene replica molds invariably contain certain defects including minute surface imperfections which cannot be eliminated from the polyethylene replica mold surfaces. Some of these surface imperfections include scratch-like markings, surface blemishes, graying, orange peel, etc. Additionally, Bowser-type polyethylene replica molds have high degrees of flexibility, and because of this, distortion of the plastic lens occurs during cure which makes it impossible to reproduce consistent lens powers from one casting to the next with the accuracy required by ophthalmic standards. Lens distortion is a particular problem when polyethylene replica molds are used to cast high power lenses, but even plano (zero power) lenses cannot be cast to any degree of repeatable accuracy with these materials.

The criticality of the polymeric compositions used to form replica molds has been confirmed by many unsuccessful attempts to obtain accurate replications of glass surfaces using a multitude of commercially available resins to form the replica molds. It has been found that the great majority of these resins do not work satisfactorily for one reason or another. Some resins tried unsuccessfully include polymers of allyl methacrylate, styrene triallyl cyanurate, diethylene glycol dimethacrylate, triethylene glycol dimethacrylate, and even polymerized allyl diglycol carbonate itself as a replica mold material.

It is believed that there are many reasons why most polymeric compositions tried do not yield satisfactory results in replication processes such as those described herein. For example, low-melting polyethylenes, such as those taught by Bowser, appear to form microscopic defects in the mold surfaces which reproduce in the final plastic lenses. Also, these materials are not believed to be sufficiently rigid and stiff to prevent distortion of the curing plastic lens. On the other hand, materials such as linear polymethyl methacrylate produce replica molds whose surfaces are solvent attacked by one of the materials primarily used in forming plastic lenses, i.e., allyl diglycol carbonate resin (sold commercially by Pittsburgh Plate Glass Co. under the registered trademark CR-39). A solvent attack of this nature produces a matte finish on the final plastic lens making it unsatisfactory.

Another property which makes some polymeric materials unacceptable is their release characteristics from the plastic lens being molded. Examples of materials which do not have satisfactory release characteristics from cured CR-39 include such resins as linear polystyrene, polyester, alkyd and epoxy.

Despite the fact that the attempts to date have been unsuccessful in arriving at a replication process using polymeric replica molds which produces high-quality optical components and which is commercially feasible, there is a tremendous amount of research continuing in this area for such a process. The many great advantages costwise and otherwise which would flow from such a successful process are well documented in the literature in general and in particular in the above-mentioned Bowser patents.

SUMMARY OF AN EMBODIMENT OF THE INVENTION

This invention relates to the use of a limited number of polymeric compositions to form replica molds useful in replication molding of plastic optical components. The new polymeric compositions are those which provide the replica molds with characteristics necessary to produce high-quality plastic optical components from CR-39 and other plastics. These characteristics include: (a) good releasability from a master mold surface which is usually, but not necessarily, formed from glass or metal; (b) balanced adhesion to the plastic optical element during and after its cure; (c) resistance to solvent attack by the plastic optical element during its cure; (d) thermal stability at the molding temperature; and, (e) the capability of forming optical quality mold surfaces which are reproducible in the molded plastic optical element.

As mentioned above, it has been found that most common polymeric compositions do not provide replica molds having these properties. Five polymeric compositions which have been found to provide the desired characteristics include: (1) polymethyl methacrylate cross-linked with minor amounts of a cross-linking agent; (2) a copolymer of 99–20 parts methyl methacrylate and 1–80 parts of acrylonitrile wherein the copolymer is linear or preferably cross-linked with a minor amount of a cross-linking agent; (3) polystyrene cross-linked with a minor amount of a cross-linking agent; (4) a copolymer of 90–10 parts styrene and 10–90 parts of acrylonitrile wherein the copolymer is crosslinked with a minor amount of a cross-linking agent; and, (5) a copolymer of 90–10 parts styrene and 10–90 parts methyl methacrylate cross-linked with a minor amount of a cross-linking agent.

It should be noted that it is not possible to specify broad classes of polymers by their chemical characteristics with any degree of assuredness that all species in the broad class will form suitable replica molds. Therefore, the description herein, in contrast to much of the prior art, will not attempt to describe the polymeric compositions found suitable by using such labels as "thermosetting," "thermoplastic," "linear," "cross-linked", "homopolymers," "copolymers," etc. It will be seen that various polymeric compositions have been found suitable which fit into all of these classes. On the other hand, it has been found that the polymeric compositions must have certain characteristics during and after cure of the plastic lens being molded, and it is possible to define suitable polymers in terms of these characteristics.

Replication molding techniques for producing plastic optical elements from CR-39 and other plastic resins can be used with the new replica molds. A replica mold with a surface configuration negative to that of the final element is formed from polymeric compositions such as those described above. The plastic resin is then molded against the polymeric replica mold, and after cure the plastic optical element is released from the replica mold. This procedure can be repeated using the same replica mold so that a plurality of lenses can be made from one replica mold.

The polymeric replica molds and replication processes described herein have many advantages over those previously known. For example, the replica molds described herein can be repeatedly used to produce many plastic lenses if care is taken to keep them clean. This was not true of many of the prior art replica molds such as those taught in the Bowser patents since lowmelting polyethylenes melted and tended to fuse together during casting of the final plastic lens. The concomitant economic advantages are clear.

The most important advantage, however, is the quality of the plastic optical elements that can be cast using the replica molds and replication processes described herein. The quality is so high, in fact, that the plastic lenses produced are suitable for use in ophthalmic applications. These lenses have less defects in their surfaces than prior art lenses on both a macroscopic and microscopic level. Furthermore, the lenses produced are substantially free from distortion, and plastic lenses of even high powers are consistently reproducible.

DESCRIPTION OF THE PREFERRED EMBODIMENTS

In the replication of plastic lenses, the replica mold surface is formed against a master mold surface. Usually the master mold is formed from glass or metal, but other materials could be used as well. Therefore, an important characteristic which the polymeric compositions used must impart to the replica molds is releasability from a master mold surface after the replica mold composition has cured. Polymeric compositions which do not have good releasability from the master mold surface are not suitable for replica molds.

The polymeric compositions used to form the replica molds must also exhibit balanced adhesion to the plastic optical element during its cure. Since some plastics, such as CR-39, shrink during their cure, the replica mold must exhibit sufficient adhesion to follow the shrinkage of the plastic lens during cure. Otherwise, the replica mold will become separated from the plastic lens prior to the completion of cure which results in lens distortion. On the other hand, after curing is completed, the replica mold must release from the plastic lens without causing surface defects in the lens. Balanced adhesion can be obtained by matching the polymeric composition of the replica mold to the particular plastic from which the lens is being formed. Those skilled in the art will know suitable materials or be able to match materials using only routine experimentation.

Another characteristic which the polymeric composition must impart to the replica mold is resistance to solvent attack by the plastic composition from which the lens is being formed. It is important in this regard to recognize that both the lens monomer and polymer must not attack the replica mold. If either does, surface imperfections will be caused in the mold surface which carry through to the final lens surfaces. Resistance to solvent attack is something that can be routinely checked in the various handbooks available to those skilled in the art or can be determined by no more than routine experimentation.

Thermal stability at the molding temperature for the plastic optical element is another requirement for the polymeric compositions. With some plastic compositions, such as CR-39, there is some leeway in the curing temperatures. For example, it has been found that CR-39 can be cured at 50°C. in three days, whereas cycles reaching higher temperatures, such as 115°C., can shorten the cure cycle to less than one day. In general, it is an advantage to have the replica molds thermally stable at higher temperatures so that the cure cycle can be shortened. The polymeric compositions should, therefore, be thermally stable at 50°C., and preferably 115°C.

To prevent distortion of the plastic element during cure, it has been found that the polymeric composition forming the replica mold must have a moderate to high degree of rigidity, or stiffness. Although, as pointed out above, the material must have the capability to follow the element's shrinkage during cure, it has been found that highly flexible materials, such as the low molecular weight polyethylenes described in Bowser, result in intolerable amounts of lens distortion. Sufficient mold rigidity and stiffness can be obtained by making the molds sufficiently thick and from plastic compositions having a flexural modulus above about $2 \times 10^5$ psi, and preferably above about $3.5 \times 10^5$ psi. For this invention, a material's flexural modulus can be determined by A.S.T.M. test D790. Values for the flexural modulus of various polymeric materials are given in most plastic handbooks including Modern Plastics Encyclopedia, 1970–71, vol. 47, No. 10A, October, 1970.

Replica molds for producing plastic ophthalmic lenses according to this invention usually have a thickness ranging between 3 and 25 millimeters. The most preferred thicknesses are 6–15 millimeters. Thinner polymeric compositions can be used if they are suitably backed by a rigid member.

It has been found that polymeric compositions which provide replica molds with the above-mentioned characteristics are indeed unique. As pointed out above, many polymeric compositions have been found to be unsuccessful because they did not provide one or more of the above characteristics. On the other hand, five polymeric compositions, representative of those which do provide the required characteristics, are now presented.

The first of these materials is polymethyl methacrylate cross-linked with a minor amount of a cross-linking agent. Preferably, the polymethyl methacrylate is cross-linked with from about 5 to about 30 percent of a cross-linking agent.

Another material found to produce suitable replica molds is a copolymer formed from 99–20 parts of methyl methacrylate and 1–80 parts of acrylonitrile. It is not necessary to cross-link this copolymer, although minor amounts of a cross-linking agent are preferable. In a more preferred embodiment, this copolymer contains 65–25 parts methyl methacrylate and 35–75 parts acrylonitrile, and the copolymer is cross-linked with about 5–30 percent of a cross-linking agent. It has been found that an outstanding replica mold can be produced from a 30/70 copolymer of methyl methacrylate/acrylonitrile cross-linked about 2 to 15 percent, which is the most preferred embodiment.

A further polymeric composition suitable for replica molds is styrene cross-linked with minor amounts of a crosslinking agent. In a more preferred case, the polystyrene is cross-linked with from 1 to 20 percent of a cross-linking agent.

Another suitable polymeric composition is a copolymer formed from 90–10 parts of styrene and 10–90 parts pf acrylonitrile, with the copolymer being cross-linked with minor amounts of a cross-linking agent. In a more preferred embodiment, this copolymer comprises 80–60 parts of styrene and 20–40 parts of acrylonitrile, cross-linked with 5–20 percent of a cross-linking agent.

A further suitable polymeric composition is a copolymer formed from 90–10 parts styrene and 10–90 parts methyl methacrylate cross-linked with 5–30 percent of a cross-linking agent. In a more preferred embodiment, this copolymer is comprised of 80–30 parts styrene and 20–70 parts methyl methacrylate with about 10–20 percent cross-linking agent. The most preferred copolymer comprises about 50 parts of both styrene and methyl methacrylate with about 10 percent cross-linking agent.

Although most of the polymers recited above would be generally categorized as vinyl or acrylic polymers, it is important to recognize that many other types of polymers will produce polymeric compositions providing replica molds with the necessary characteristics. As can also be seen, some of the mateials have been found to require cross-linking while others don not. The critical distinction between polymeric compositions suitable for producing replica molds as described herein and those of the prior art is that the newly described polymeric compositions will produce a replica mold having the characteristics specified above. The polymeric compositions heretofore used for ophthalmic replica molds do not have these characteristics, and because of that they have not resulted in replication processes which produce high-quality optical elements on a commercial basis.

Some of the preferred polymeric compositions set out above are cross-linked. Suitable cross-linking agents are those monomers which possess a functionality exceeding two, i.e. polyfunctional. Those skilled in the art will know many suitable cross-linking agents. The preferred cross-linking agents are glycol dimethacrylates which can be produced by esterifying methacrylic acid with a glycol containing from two to four carbon atoms or with a polyglycol having from four to eight carbon atoms. Such glycols include diethylene glycol, triethylene glycol, tetraethylene glycol, dipropylene glycol and the like as well as ethylene glycol and propylene glycol. These materials are hereinafter described simply as glycol dimethacrylates.

Another preferred cross-linking agent is divinylbenzene. Divinylbenzene is obtainable commercially as a 55 percent solution, with the major impurities being believed to be ethyl vinyl benzene, diethylbenzene and a variety of non-volatile components. This mix can be used as received, or it can be purified by fractionation to give divinylbenzene of better than 95% purity. The purified divinylbenzene is preferred.

Additional cross-linking agents which are suitable include allyl methacrylate, diethylene glycol dimethacrylate, triethylene glycol dimethacrylate, tetraethylene glycol dimethacrylate, triethylol propane trimethacrylate, glyceryl trimethacrylate, pentaerythritol tetramethacrylate and the corresponding acrylates. Others include triallyl cyanurate, diallyl phthalate, diallyl adipate, diallyl succinate, diallyl maleate, diallyl fumarate, and diallyl diglycolate.

In this description, the amount of cross-linking agent used is specified in terms of weight percent of the polymer or copolymer.

Replication processes for producing high-quality plastic optical elements using the hereindescribed replica molds are carried out as follows. In the first step, a replica mold is formed which has a surface configuration negative to a predetermined surface configuration for the plastic optical element. The replica mold is formed from a plastic composition such as those described above by casting against the master mold's positive surface. After a replica mold has been formed, a suitable plastic, such as CR-39, is then molded against the replica mold surface configuration. After cure, the plastic optical element is released from the replica mold.

It is possible to cast the polymeric compositions against the master molds described herein at atmospheric pressure. In most cases, however, it is preferred to use a positive pressure to hold the replica molds against the masters. This is particularly true where curved surfaces or surfaces having discontinuities are to be reproduced. Pressure sufficient to compensate for shrinkage of the resin during casting is preferably used, and in most cases pressures in the order of 50 lbs. per square inch gage or higher produce the best results.

To a limited extent, the molds can be cast between two rigid surfaces, provided they are allowed to come together by means of a peripheral flexible gasket. Much better results are usually obtainable, however, when the replica mold is cast between a rigid surface which carries the curvature of the ophthalmic lens or other optical surface to be reproduced, and a flexible member capable of accomodating the polymerization shrinkage of the resin. Such a member may be made of any material having the necessary flexibility and mechanical strength. One very suitable member comprises a sheet of aluminum foil from about 0.003 inches to 0.040 inches thick. Such a foil can be formed to any desired shape by spinning, stamping or other conventional means.

Most plastic lenses to date have been manufactured from CR-39 (polymerized allyl diglycol carbonate). It should be clear, however, that while the plastic lenses produced as described herein are preferably CR-39, many other plastics can also be used. Some examples of other materials include unsaturated alcohol esters of simple polybasic acids such as diallyl phthalate, diallyl maleate, diallyl fumarate, diallyl succinate, diallyl carbonate, diallyl crotonate, dially diglycolate, and any other of the many resins that will copolymerize with CR-39 resin, such as dimethallyl phthalate, vinyl acetate, and methyl methacrylate. Other suitable plastic compositions include those known as TEMA resins which are produced by American Cyanamid and are usually substantially water-insoluble, non-gelled, unsaturated polyester resin compositions such as those described in U.S. Pat. Nos. 3,265,763; 3,364,291 and 3,457,104, the teachings of which are hereby incorporated by reference. Other resins having the required optical and molding properties could, of course, be used.

The replication processes will now be described in detail by reference to the Figures.

Figure 1:
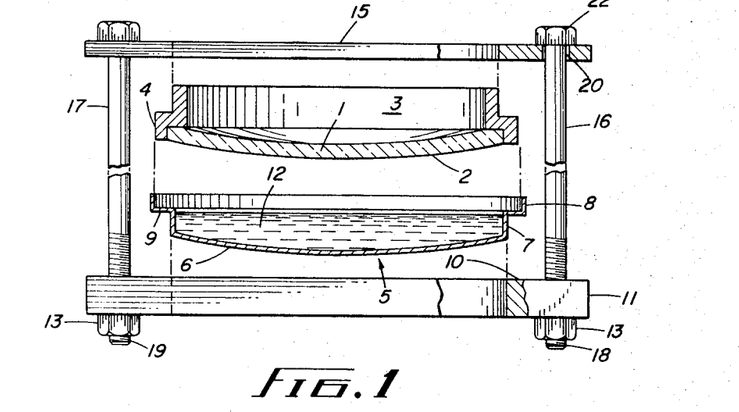
FIG. 1 illustrates a vertical section cut through a casting assembly including a glass master lens surface and a plastic resin from which a replica mold having a concave surface can be formed.

In FIG. 1, a glass master lens 1, having a convex surface 2 to be reproduced, is mounted in a holder 3 having a shoulder 4. A cup-shaped flexible member 5, which can be spun aluminum, has a central web 6 terminating in a side wall 7 and an outer flange 8 adapted to make a sliding fit with the shoulder 4. The flange 8 preferably has a lateral surface 9 adapted to engage the surface 10 of a clamping ring 11. Lateral surface 9 and flange 8 can be painted with a vinyl plastisol which is subsequently primed and baked on to insure a tight seal.

An annular plate 15 engages holder 3 above shoulder 4 and the assembly is clamped together by bolts 16 and 17 having ends 18 and 19 adapted for threaded engagement with nuts 13 on the opposite sides of the ring 11. Preferably these bolts pass through openings 20 in the plate 15. When the bolts 16 and 17 are tightened, a positive pressure of 50-100 lbs. per square inch or more can be applied to the casting after the surface 10 has engaged the lateral surface 9 of the membrane 5.

Figure 2:
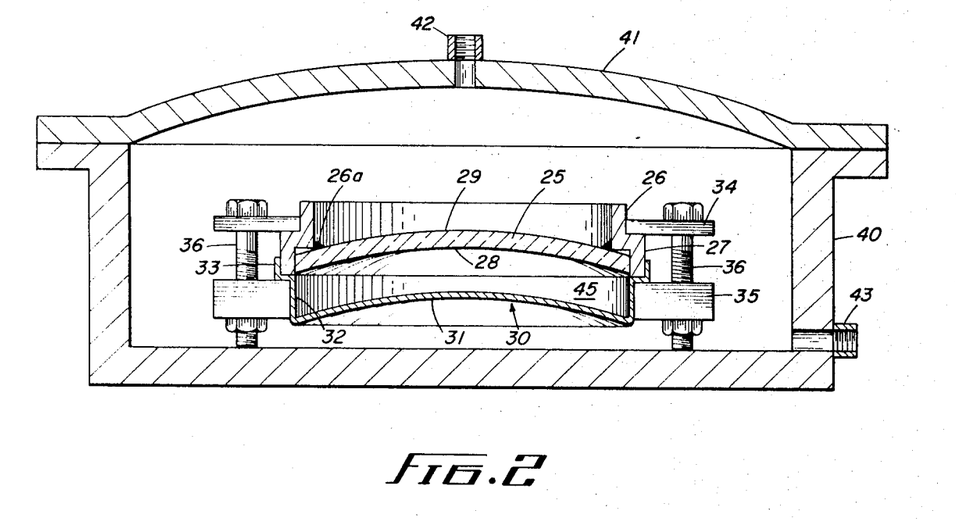
FIG. 2 illustrates a casting assembly within a pressure chamber wherein the casting assembly is suitable for forming a convex replica mold from a concave glass master lens.

In the apparatus of FIG. 2, a glass master lens 25 is mounted in a holder 26 having a shoulder 27. The lens is shown as having a concave surface 28 to be reproduced, although it should be evident that the convex surface 29 could be substituted simply by reversing the position of the lens on shoulder 27, as shown in FIG. 1. The outer edge of the lens is preferably covered with a fillet 26a of sealing cement to make a liquid-tight joint.

A flexible, aluminum foil member 30 is formed having a central web 31 terminating in a side wall 32 and an outer flange 33 adapted to make a sliding fit with the shoulder 27. Member 30 and lens holder 26 are received in rings 34 and 35, which are clamped together by bolts 36.

Polymerization shrinkage of the plastic composition being molded is accommodated by the movement of the flexible member and thus large curvatures and sharp surfaces discontinuities can be reproduced accurately.

In order to apply positive pressure to the casting, the entire mold is enclosed within an outer pressure-resistant casing 40 adapted with a closely fitting lid 41 affixed by clamps, bolts or other securing means that are not shown. An opening 42 is provided to permit the application of pneumatic or hydrostatic pressure to the flexible member 30 and through flexure of this member to the plastic composition during the curing thereof. When both positive pressure and a flexible member are used in this manner, one in conjunction with the other, it is possible to cast highly complex shapes and extreme curvatures and discontinuities in the mold surfaces and the like from any of the resins described above. If desired, a second opening 43 may be provided in the side wall of the casing 40 to permit continuous flow of the pressurizing fluids.

Castings are carried out in this equipment by placing a predetermined quantity of one of the above-described polymeric compositions in an essentially monomeric or partially polymerized but still liquid condition into the cavity 12 of flexible member 5 in FIG. 1, or into the mold cavity 45 of FIG. 2. The cavity is closed and the temperature is controlled by the medium circulating in casing 40 until polymerization is complete. Curing catalysts such as azo bis-isobutyrlonitrile, peroxides, percarbonates and the like may be included in the manner customary in molding resins of this type. Polymerization is generally carried out at temperatures within the range of about 40°C. to about 95°C. or slightly higher and for times that will depend on the thickness of the casting and other related factors. Suitable curing times are usually within the range of about 1 to 6 hours but may be as high as up to 35-40 hours with unusually thick castings.

It is an advantage in the embodiment of FIG. 2 that both heat and pressure may be applied through the same medium. Thus, water or air heated to the desired curing temperature and under suitable pressure, preferably about 50 to 100 pounds per square inch, may be introduced through the inlet opening 42 and applied to the member 30 and transmitted by its flexure to the plastic resin in cavity 45. Thus, the flexible member 30 serves three purposes: (1) it acts as a mold cavity wall; (2) it serves to accomodate lens shrinkage; and (3) it serves as a good conductor of heat to the curing lens.

Continuous positively controlled temperature regulation can be obtained by maintaining a flow of such fluids through inlet opening 42 and the outlet opening 43, and the curing cycle can be greatly shortened by circulating a temperature controlled fluid in this manner. This will permit a more rapid transfer of heat out of the casting for those polymeric compositions exhibiting exotherms as they polyerize.

Figure 3:
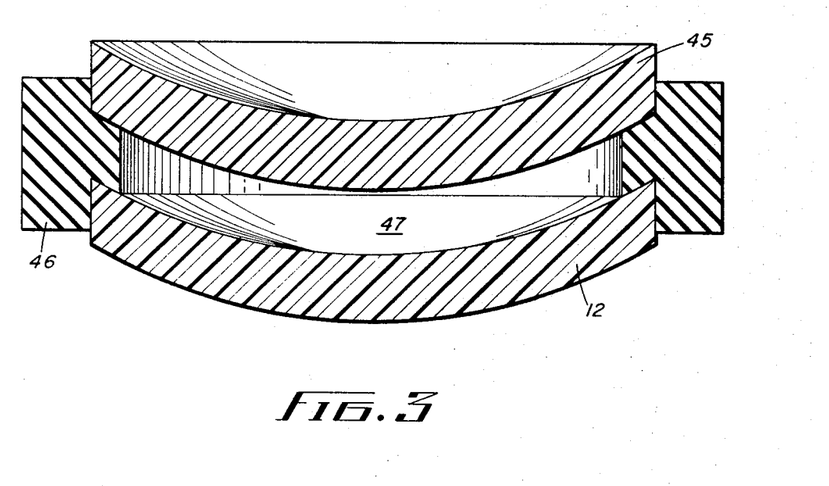
FIG. 3 illustrates the casting of a plastic lens between two replica molds.

The replica molds prepared in this manner are used to cast plastic resins, such as CR-39, into optical components and particularly ophthalmic lenses. A representative assembly illustrating their use for this purpose is shown in FIG. 3. Castings 12 and 45 are the castings indicated by the same reference numerals in FIGS. 1 and 2, respectively. These are accommodated in opposition by an annular spacing gasket 46. A measured quantity of the plastic resin mix, such as CR-39 monomer, is introduced into the space 47 between castings 12 and 45 together with one of the catalysts described in U.S. Pat. No. 2,384,115, if desired. The casting assembly is held together by clamps. Ring 46 is preferably made of a flexible material such as plasticized vinyl resin or polyethylene-polyisobutylene. The assembly is then heated to curing temperatures, preferably within the range of about 40°C. to 90°C., until the plastic resin has polymerized to the desired extent. After cooling, the plastic lens is released from between the replica molds.

In the description above, the term "plastic optical element" has been used. While in most cases, it is used in connection with plastic ophthalmic lenses, it should be understood that the term is intended to mean any type of plastic element which has an optical quality surface thereon which includes lenses other than ophthalmic lens, mirrors, etc., and even includes plastic molds for forming optical components.

The following examples illustrate the remarkable improvement which can be achieved using polymeric replica molds and processes as described herein instead of those described in the prior art. All parts and percentages are by weight unless otherwise specified.

EXAMPLE I

PRIOR ART REPLICATION PROCESS

The materials and procedure of Example I, U.S. Pat. No. 3,422,168, were followed with minor differences as noted to produce plastic lenses by the most well known prior art technique.

Two ground and polished glass lenses having a convex surface of six diopters and a concave surface of six diopters and having a diameter of 66 millimeters were used as the master lenses. The resin selected to constitute the finished plastic lens was allyl diglycol carbonate (CR-39). A catalyst and drying agent were added, and the resin was filtered and subsequently stored under refrigeration as described in the second paragraph of Example I, U.S. Pat. No. 3,422,168.

The master glass lenses were mounted in aluminum mounting rings complete with rubber gaskets and bolted covers through which pressure could be introduced. In one case, the convex side of one lens formed the bottom of a cavity in the aluminum mounting ring; in the other, the concave side of the lens formed the bottom of a similar cavity. The cavities in the mounting rings were filled with a low-melting polyethylene resin ("Epolene" C-15 was used since "Epolene" C-12 is no longer commercially available) which had been heated to 257°F. The resin was poured along the edge of the mounting ring so as not to pour it directly onto the master glass lenses.

The rubber gaskets were inserted and the covers for the mounting rings bolted down. The assemblies were allowed to air cool to 130°F., and the covers and gaskets were removed. The convex and concave replica molds formed were simply pryed from the aluminum mounting rings.

The two replica molds were then used to mold CR-39 lenses. The previously prepared and refrigerated CR-39 resin was poured directly into the depression of the concave mold and the convex portion was then inserted. The replica molds filled with CR-39 resin were passed through the following curing cycle in an air circulating oven to cure the CR-39.

| Time (hrs:min) | Temp. °F. |
|---|---|
| 0:00 | 115 |
| 1:00 | 118 |
| 2:00 | 122 |
| 3:00 | 126 |
| 4:00 | 129 |
| 5:00 | 145 |
| 5:30 | 151 |
| 5:45 | 154 |
| 5:55 | 159 |
| 6:10 | 165 |
| 6:30 | 176 |
| 7:30 | End of cycle |

The replica molds were separated by hand and the finished CR-39 lens was removed.

Five CR-39 lenses were produced following the abovedescribed procedures. These lenses had surface imperfections such as pin pricks, scratch-like markings or surface blemishes which were visible to the eye; also, some matching imperfections could be seen in the replica mold surfaces. Additionally, it could be observed that the lenses were all badly distorted.

To further evaluate the lenses, a telescope test was used to determine their refractive power and definition. For plano lenses, the test conditions are referred to as USA Standard Z87.1—1968, published by the Industrial Safety Equipment Association, Inc., as approved Sept. 18, 1969 by the USA Standards Institute. These methods are equivalent to the National Bureau of Standards methods which are as follows:

Refractive Power — The lenses may be tested for refractive power with an eight-power telescope which has an effective aperture of 0.75 inch and is focused at a distance of 35 feet on an illuminated test chart. The resolving-power chart pattern 20 of National Bureau of Standards circulus C533 may be used. The lens to be tested shall be placed in front of the telescope objective which is then brought to the sharpest possible focus. The pattern marked 20 should be clearly resolved with the target placed at a distance of 35 feet from telescope objective used for testing lenses. The telescope is calibrated by successively locating the position of best focus with first a standard lens of plus one-sixteenth diopter in front of the objective and then with a standard lens of minus one-sixteenth diopter in front of the objective. These positions are marked by scratches on the draw tube or by other suitable index marks. The lens is to be held in front of the calibrated telescope and if the position of the best focus falls outside the index marks, the refractive power is in excess of one-sixteenth diopter.

Definition — The lenses may be tested for definition with an eight-power telescope which has an effective aperture of 0.75 inch and is focused at a distance of 35 feet on an illuminated test chart. As a test chart the resolving-power chart pattern 20 of National Bureau of Standards Circular C533 may be used. The lens to be tested shall be placed in front of the telescope objective, which in turn is then brought to the sharpest possible focus. The pattern marked 20 should be clearly resolved with the target placed at a distance of 35 feet from the telescope objective used for testing lenses.

All five lenses produced by following the procedures of this Example using low-melting polyethylene replica molds failed the above-described telescope test.

Shearing interferograms of five lenses produced by this method were taken in transmission. A lateral shearing interferometer was used which was set up as follows. The lens being tested was placed in a diverging beam of light such that the light leaving the lens was essentially collimated. The collimated beam was incident on a plane parallel plate of glass. Part of the collimated beam was reflected from the front surface of the glass, and part of it was reflected from the back surface. The two reflected beams were displaced laterally (sheared) a distance S. If the beam leaving the lens was not perfectly collimated, interference fringes appeared in the common area of the two reflected beams. The spacing of these fringes has been shown to be inversely proportional to the relative local power of the lens. A more detailed explanation of this shearing interferometric technique for testing ophthalmic lenses is presented in: Murty, M. V. R. K.; *Applied Optics;* Apr., 1964; page 531.

Figure 4:
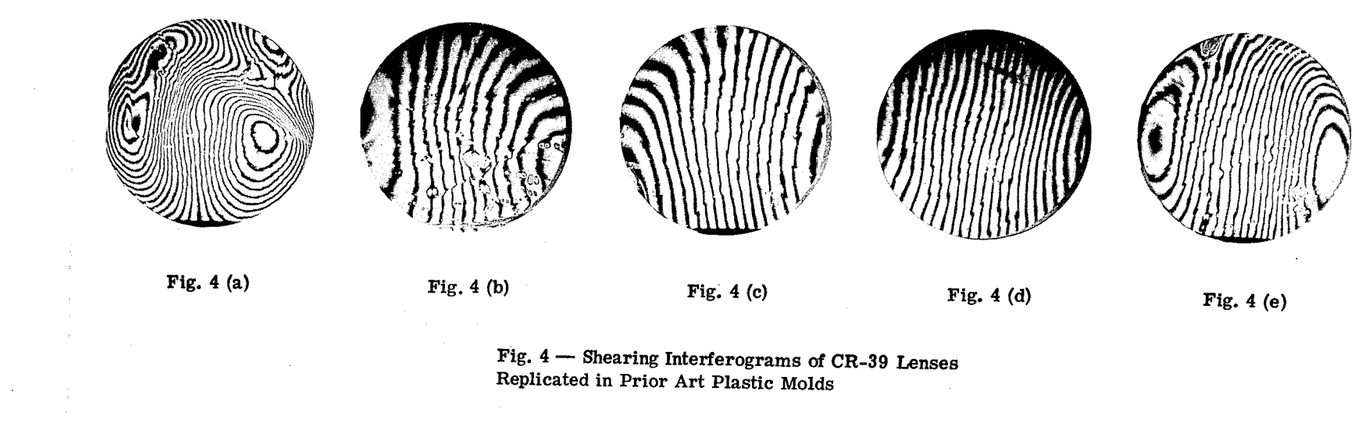
FIG. 4 shows shearing interferograms of plastic lenses produced according to the prior art.

The interferograms are presented in FIG. 4. They are a graphical representation of surface power variation and defects in the tested lenses. Perfectly vertical and equally spaced interference lines represent the most uniform power distribution over the lens surfaces.

As can be seen from the shearing interferograms of FIG. 4, both the power variation and surface smoothness of the five lenses was poor. The power variation in lenses 4a and 4e were particularly objectionable and were easily discerned with the unaided eye. Other particularly objectionable features were the high frequency fringes or local defects noticed in lenses 4b and 4e. These local defects were replicas of pits and dents in the low density polyethylene molds.

The same five lenses were also viewed under an 80X microscope. All had well-defined areas containing a high density of very fine parallel scratches approximately 0.01 inches long. These areas were easily seen when the lenses were examined under a bright light. The low density polyethylene molds used to make these lenses possessed corresponding scratch containing areas.

EXAMPLE II

REPLICATION PROCESS USING REPLICA MOLDS FORMED FROM POLYMERIC COMPOSITIONS AS DESCRIBED HEREIN

The glass master was the same as in Example I. A master was used in an apparatus as shown in FIG. 1 to produce a replica mold having a concave surface; another master was used in an apparatus of FIG. 2 to produce a replica mold having a convex surface.

The replica molds were formed from cross-linked polystyrene. The liquid resin cast against the glass masters contained:

| | |
|---|---|
| styrene monomer | 90 parts |
| ethylene glycol dimethacrylate | 10 parts |
| isopropyl percarbonate | 0.05% |
| benzoyl peroxide | 0.05% |
| t-butyl perbenzoate | 0.05% |
| cobalt octoate (12% solution in dibutyl phthalate) | 0.02 |
| Zelec UN (a mold-releasing agent believed to be a lauroyl phosphate sold by DuPont). | 0.05% |

The percents given are weight percents based on the copolymer.

Curing of the styrene resin was done in an autoclave as illustrated in FIG. 2 under a positive pressure of 60 psi maintained by circulating water. The water temperature was held at 60°C. for 4 hours, then raised to 115°C. for 2 hours and finally allowed to cool to 70°C.

After curing, the pressure was released and the mold was opened. The aluminum foil was peeled off and the plastic replica molds separated easily from the glass master. Each replica mold was 9 millimeters in thickness.

CR-39 resin, prepared and refrigerated as in Example I, was introduced into the cavity formed when the replica molds were fitted together. The cure cycle of Example I was also used for the CR-39 resin. After cure the CR-39 lenses were easily released from the cross-linked polystyrene replica molds.

Five plastic lenses produced according to this Example were examined. These plastic lenses had dramatically fewer imperfections visible to the eye and much less distortion. They were used in the telescope test and all passed.

Shearing interferograms were taken of five lenses produced following the procedure of this Example. The results are presented in FIG. 5.

Figure 5:
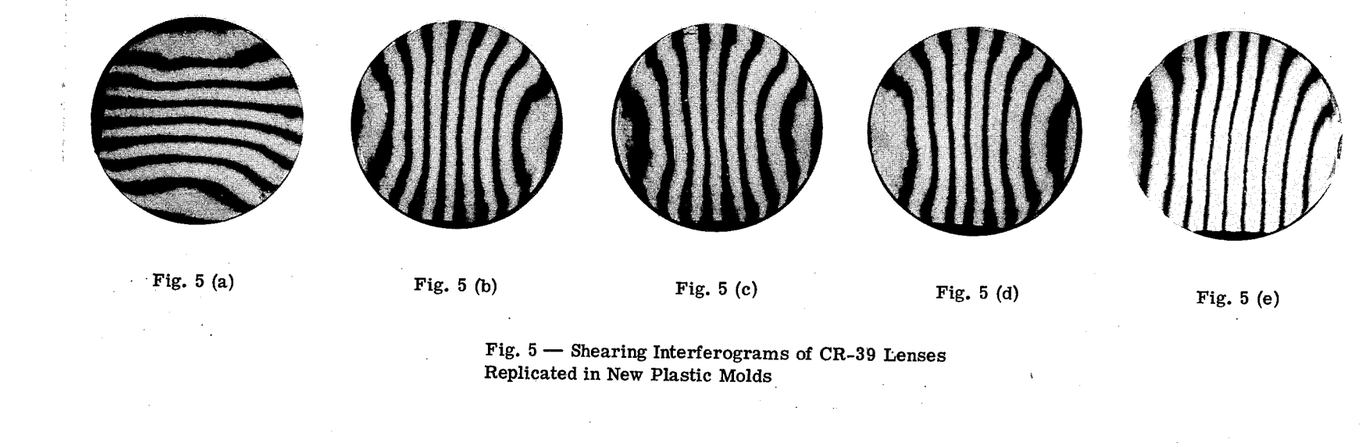
FIG. 5 shows shearing interferograms of plastic lenses produced as described herein.

As can be seen, the power variation and surface smoothness are vastly improved over those qualities in the lenses produced in Example I.

Additionally, the areas containing a high density of very fine parallel scratches seen under an 80X microscope with the lenses of Example I are not present on the lenses produced according to Example II.

From the tests performed, it can be seen that the lenses produced by Example II are significantly improved over the lenses produced by the procedure of Example I. The lenses produced in Example II are suitable for ophthalmic uses, whereas the lenses produced in Example I are not.

Reference is made to my commonly assigned co-pending applications, Beattie, Ser. Nos. 210,488, now Pat. No. 3,806,079 and 210,518, respectively, filed concurrently herewith, the teachings of which are hereby incorporated by reference.

What is claimed is:

1. A replica mold for producing a plastic optical element having a predetermined surface configuration from a master mold surface, said replica mold having a surface configuration negative to said element's predetermined surface configuration and said replica mold being formed from a polymeric composition which has a flexural modulus above about $2.0 \times 10^5$ psi so that the mold will resist distortion of the plastic optical element during cure thereof, said polymeric composition also being one which: (a) is releasable from a master mold surface; (b) has balanced adhesion to said plastic optical element during cure thereof whereby the mold will follow the element during cure and release from the element after cure; (c) is resistant to solvent attack by said plastic optical element during cure thereof; (d) is thermally stable at the molding temperature for said plastic optical element; and, (e) is capable of forming an optical quality surface on the plastic optical element.

2. A replica mold of claim 1 wherein the entire mold is formed from said polymeric composition, the mold has a thickness of from about 6 to about 15 millimeters, and the polymeric composition has a flexural modulus above about $3.5 \times 10^5$ psi.

3. A replica mold of claim 2 wherein said plastic optical element comprises an ophthalmic lens.

4. A replica mold of claim 3 wherein said polymeric composition is releasable from a glass master mold surface.

5. A replica mold of claim 4 wherein said replica mold is formed from a polymeric composition comprising a member selected from the group consisting of:
   a. polymethyl methacrylate cross-linked with a minor amount of a cross-linking agent;
   b. a copolymer formed from about 99 to about 20 parts of methyl methacrylate and about 1 to about 80 parts of acrylonitrile, said copolymer being cross-linked with from 0 to a minor amount of a cross-linking agent;
   c. polystyrene cross-linked with a minor amount of a cross-linking agent;
   d. a copolymer formed from about 90 to about 10 parts of styrene and from about 10 to about 90 parts of acrylonitrile, said copolymer being cross-linked with a minor amount of a cross-linking agent; and,
   e. a copolymer formed from about 90 to about 10 parts of styrene and from about 10 to about 90 parts of methyl methacrylate, said copolymer being cross-linked with a minor amount of a cross-linking agent.

6. A replica mold of claim 5 wherein said polymeric composition comprises polystyrene cross-linked with from about 1 to about 20 percent of a cross-linking agent.

7. A replica mold of claim 6 wherein said cross-linking agent comprises glycol dimethacrylate.

8. A replica mold of claim 5 wherein said polymeric composition is a copolymer comprising from about 65 parts to about 25 parts of methyl methacrylate and from about 35 parts to about 75 parts of acrylonitrile, said copolymer being cross-linked with from about 5 to about 30 percent of a cross-linking agent.

9. A replica mold of claim 8 wherein said cross-linking agent comprises glycol dimethacrylate.

10. A replica mold of claim 5 wherein said polymeric composition is a copolymer comprising about 30 parts methyl methacrylate and about 70 parts acrylonitrile, said copolymer being cross-linked with from about 5 to about 30 percent of glycol dimethacrylate.

11. An ophthalmic replica mold having a surface configuration negative to that of a master mold, said replica mold being formed from a polymeric composition comprising a member selected from the group consisting of:
   a. polymethyl methacrylate cross-linked with from about 5 to about 30 percent of a cross-linking agent;
   b. a copolymer formed from about 65 to about 25 parts of methyl methacrylate and from about 35 to about 75 parts of acrylonitrile, said copolymer being cross-linked with from about 5 to about 30 percent of a cross-linking agent;
   c. polystyrene cross-linked with from about 1 to about 20% of a cross-linking agent;
   d. a copolymer formed from about 80 to about 60 parts of styrene and from abour 20 to about 40 parts of acrylonitrile, said copolymer being cross-linked with from about 5 to about 20 percent of a cross-linking agent; and,
   e. a copolymer formed from about 80 to about 30 parts styrene and from about 20 to about 70 parts of methyl methacrylate said copolymer being cross-linked with from about 10 to about 20 percent of a cross-linking agent.

12. An ophthalmic replica mold of claim 11 wherein said polymeric composition comprises polystyrene cross-linked with from about 1 to about 20 percent of glycol dimethacrylate.

13. An ophthalmic replica mold of claim 11 wherein said polymeric composition is a copolymer comprising about 30 parts methyl methacrylate and about 70 parts acrylonitrile, said copolymer being cross-linked with from about 5 to about 30% of glycol dimethacrylate.

14. A replica mold for producing a polymerized allyl diglycol carbonate lens having a predetermined ophthalmic surface configuration from a master mold surface, said replica mold having a surface configuration negative to said lens surface configuration and said replica mold comprising a polymeric composition which is releasable from said master mold surface, has balanced adhesion to the lens during cure thereof, is resistant to solvent attack by allyl diglycol carbonate during polymerization thereof, is thermally stable at the molding temperature, is capable of forming an ophthalmic quality surface on the lens, and has a flexural modulus above about $3.5 \times 10^5$ psi.

* * * * *